Patented Sept. 20, 1938

2,130,947

UNITED STATES PATENT OFFICE 2,130,947

DIAMINE-DICARBOXYLIC ACID SALTS AND PROCESS OF PREPARING SAME

Wallace Hume Carothers, Wilmington, Del., assignor to E. I. du Pont de Nemours & Company, Wilmington, Del., a corporation of Delaware No Drawing. Application July 1, 1936, Serial No. 88,491. Renewed May 20, 1938. In Canada May 25, 1935

18 Claims. (Cl. 260—501)

This invention relates to new compositions of matter, and more particularly to salts derived from diamines and dibasic acids.

This application is a continuation in part of my application Serial Number 74,811, filed April 16, 1936, which is a continuation in part of abandoned application Serial Number 34,477, filed August 2, 1935.

In the application above referred to I have disclosed fiber-forming polyamides made by reacting diamines and dibasic acids. As an advantageous way of making these polyamides I have included among the methods described the formation of the diamine-dibasic acid salt as an intermediate step between the reaction of the initial ingredients and the production therefrom of the desired polyamides. It is with these diamine-dibasic acid salts and their preparation that the present invention is concerned.

I am aware that certain diamine-dibasic acid salts such as those derived from oxalic acid and octamethylenediamine (Ber. 20, 1445 (1887)), or from ethylenediamine and succinic acid (Ber. 27, R, 404 (1894)) have been prepared, but these salts, unlike the new class of salts herein described, are of little or no utility as intermediates in the formation of fiber-forming polyamides.

An object of this invention is to prepare new compositions of matter. Another object is to prepare compounds useful in the preparation of polyamides. Still further objects are the preparation of new diamine-dibasic acid salts and methods for their preparation. Other objects will appear hereinafter.

These objects are accomplished by bringing the diamine and dibasic acid of the selected type described more fully below into sufficiently intimate contact, preferably in a solvent, to bring about the formation of a salt. The temperature at which the diamine and dibasic acid are brought into contact must be low enough to prevent decomposition of the salt.

As indicated in my above mentioned copending application, the preparation of fiber-forming polyamides requires the use of substantially chemically equivalent amounts of diamine and dicarboxylic acid. This means that a knowledge of the purity of the amine and acid is necessary to admix them in the proper portions for superpolyamide formation. In place of analyzing each reactant individually it has been discovered that the use of amine and acid in exactly equivalent chemical proportions can be attained by an electrometric method of analysis which is based on the fact that when a sample of the amine or acid is placed in water and the other component is added portionwise there is an inflection in the pH curve (graph of pH vs. quantity of added reagent) at the point at which the two reactants are present in chemically equivalent amounts. This inflection or equivalency point is easily determined from electrometric measurements of hydrogen ion concentration preferably carried out with a pH meter using glass and calomel electrodes. Typical values for the pH at the inflection point are: for pentamethylenediamine and sebacic acid, 7.50 ($\pm$.10); for hexamethylenediamine and adipic acid, 7.63 ($\pm$ 0.3); for decamethylenediamine and adipic acid, 7.71 ($\pm$ .03); for p-xylylenediamine and sebacic acid, 7.03 ($\pm$ .10). On the basis of this analysis of a test portion of the reactants it is possible to mix the amine and acid in the proper proportions for superpolyamide formation. Instead of analyzing test portions in this fashion, the approximate total quantities of amine and acid needed for the preparation of a given quantity of polyamide can be dissolved in water or other suitable solvent, and then be brought to exact equivalency by measuring the pH and adding a sufficient quantity of the reactant present in deficient amount until the inflection point is reached. This solution, preferably concentrated, is then charged into the reactor or autoclave to be used for polyamide formation. If desired, modifying agents, e. g., viscosity stabilization agents, may be added. The water is then distilled off and the residue heated to the temperature required for superpolyamide formation. The above described method of obtaining chemically equivalent proportions of the reactants for the preparation of my new salts is one of the essential steps of the process claimed in application Serial Number 113,723, filed by myself and G. D. Graves December 1, 1936, for producing polyamides from diamines and dicarboxylic acids without isolation of the salt.

In place of preparing polyamides directly from the diamine and the dibasic acid as indicated above, it has been found advantageous to prepare and isolate the diamine-dicarboxylic acid salt and use it as an intermediate in polyamide manufacture. Electrometric analysis shows that these salts contain substantially equivalent amounts of diamine and dicarboxylic acid. In other words, the pH of solutions of these salts coincides closely with the inflection point. The use of the isolated salt as indicated in my above mentioned copending application, is advantageous, since it affords a simple and automatic means for adjusting the amine and acid reactants to substantial equivalency and avoids the difficulties attendant upon the preservation of the isolated amines in the state of purity. It tends to eliminate impurities present in the original diamine and dibasic acid. These impurities are often difficult to remove by other means. Moreover, the salts are easier to handle, store, and ship than the free amine and acid.

The salt forming reaction is conveniently accomplished by mixing a solution of the diamine in a suitable solvent, such as hot alcohol or alcohol-water mixture, with a solution containing an approximately chemically equivalent amount of the dicarboxylic acid. Exact equivalency of amine and acid can be attained by measuring the pH of the resultant solution and adjusting the reactants until the inflection point is reached. In other words, it is desirable and economical to add the acid and amine in such proportions that the pH of the solution is at the inflection point which will usually lie between 6.6 and 7.8. However, either of the reactants can be used in moderate (e. g. up to 10%) excess, for the salt formed consists essentially of equimolecular proportions of the two reactants. Since the salt is usually less soluble in the solvents selected than either the diamine or dibasic acid, it generally separates from the mixture in crystalline form. Sometimes it is desirable to dissolve the diamine and dibasic acid directly in a common solvent at a moderately elevated temperature and then cool the mixture to bring about precipitation of the salt. In the preparation of the salts it is generally desirable to use temperatures in the neighborhood of 0–100° C. Care must be taken to keep the temperature below the decomposition temperature of the salt, otherwise amidation or polyamide formation occurs. In general, the salts are readily soluble in water and slightly soluble in alcohols, particularly hot alcohols. Alcohols and alcohol-water mixtures are especially useful as solvents in the preparation and crystallization of the salts. Some salts, e. g., hexamethylene diammonium adipate can be conveniently prepared in methanol.

The most useful salts for the preparation of fiber-forming polyamides are those derived from diamines of formula H$_2$NCH$_2$RCH$_2$NH$_2$ and dicarboxylic acids of formula

HOOCCH$_2$R'CH$_2$COOH in which R and R' are divalent hydrocarbon radicals free from olefinic and acetylenic unsaturation and in which R has a chain length of at least two carbon atoms. The R and R' may be aliphatic, alicyclic, aromatic, or araliphatic radicals. Of this group of salts, those in which R represents (CH$_2$)$_x$ and R' represents (CH$_2$)$_y$, where $x$ and $y$ are integers and where $x$ is at least 2, form a select class since they are especially useful in the preparation of fiber-forming polyamides of high quality. Polyamides derived from this select class of salts are easily obtained at an appropriate viscosity for spinning and have a type of crystallinity which enables them to be cold drawn with especial facility. Moreover, these polyamide fibers are all characterized by high tenacity, high orientation, lack of sensitivity to conditions of humidity, exceptionally good elastic recovery, extraordinary resistance to most solvents and chemical agents, good dyeing properties, and exceptionally good ageing characteristics in air even at moderately elevated temperatures.

The diamine-dicarboxylic acid salts of this invention are crystalline solids having fairly definite melting points. They are relatively insoluble in acetone, ether, and benzene. As already indicated, they are soluble in water and alcohol-water mixtures. They dissociate in water to give diammonium ions of formula

NH$_3$CH$_2$RCH$_2$NH$_3$ and dicarboxylate ions of formula

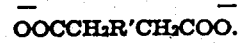
OOCCH$_2$R'CH$_2$COO.

Melting point data for a number of typical salts are given below in Table I.

TABLE I

*Diamine-dicarboxylic acid salts*

| Derived from— | | M. P. ° C. |
|---|---|---|
| Diamine | Acid | |
| Tetramethylene | Azelaic | 175–176 |
| Pentamethylene | Sebacic | 129–131 |
| Hexamethylene | Adipic | 183–184 |
| Hexamethylene | Sebacic | 170–172 |
| Octamethylene | Adipic | 153–154 |
| Octamethylene | Sebacic | 164–165 |
| Nonamethylene | Adipic | 125–127 |
| Nonamethylene | Sebacic | 159–160 |
| Decamethylene | Adipic | 142–143 |
| Decamethylene | p-Phenylene diacetic | 192–194 |
| Undecamethylene | Sebacic | 153–155 |
| Dodecamethylene | Adipic | 144–145 |
| Dodecamethylene | Sebacic | 157–158 |
| p-Xylylene | Sebacic | 210–212 |
| p-Xylylene | p-Phenylene diacetic | 250–252 |

Elementary analysis of the salts indicates that they are derived from substantially one mol each of diamine and dibasic acid. This is true even when the salts are crystallized from solutions containing a moderate excess of either reactant. In some cases, however, the salt may contain a small excess, seldom reaching 2%, of either acid or amine. As examples of such salts might be mentioned decamethylene diammonium adipate and nonamethylene diammonium adipate. On the other hand, certain salts, e. g., hexamethylene diammonium adipate, always contain equivalent amounts of amine and acid within 0.1%. The purity, i. e., the ratio of amine to acid in these salts, can easily be determined by the electrometric method of titration mentioned above. A knowledge of the purity makes it possible to adjust the ratio of amine to acid to exact equivalency if it is necessary to do so. If viscosity stable polyamides are desired, the ratio of amine to acid can be adjusted so that one reagent is present in excess.

A Beckman pH meter equipped with a glass electrode is very useful in determining the purity of the diamine-dibasic salts by the electrometric method. Its sensitivity is 0.01 pH and its accuracy about 0.02 to 0.03 pH units. In practice an excess of about 1% (beyond the inflection point) of sodium hydroxide is added to 0.01 mol of salt and about 25 cc. of carbon dioxide-free distilled water. The pH of the solution is measured during the stepwise addition of HCl until the excess of acid is about 1%. By plotting pH against cc. of HCl, the inflection point can be located by examination of the curve. Since one mol of salt contains two equivalents, 2 cc. of N/10 HCl are equivalent to an excess of 1%. Typical data for a number of salts are given below in Table II.

Table II

*Electrometric analysis of diamine-dicarboxylic acid salts*

| Salt derived from— | | pH at inflection point | Percent excess of acid | Change of pH percent at inflection point |
|---|---|---|---|---|
| Diamine | Acid | | | |
| Pentamethylene | Sebacic | 7.50 | 1.02 | 1.2 |
| Hexamethylene | Adipic | 7.63 / 7.60 | 0.00 / 0.02 | 2.3 / 2.3 |
| Nonamethylene | Adipic | 7.63 | 1.95 | 2.9 |
| Nonamethylene | Sebacic | 7.63 | 0.06 | 3.8 |
| Decamethylene | Adipic | 7.74 / 7.70 | 1.82 / −0.40 | 2.6 / 2.6 |
| Decamethylene | p-Phenylene diacetic | 7.52 | 0.20 | 3.8 |
| p-Xylylene | p-Phenylene diacetic | 6.68 | 0.13 | 5.0 |
| p-Xylylene | Sebacic | 7.03 | 0.1 | 0.67 |

Examples illustrating the preparation of the products of this invention are given below; parts are given by weight:

Example I

A mixture of 144 parts of hexamethylenediamine, 174 parts of adipic acid, 1300 parts of 95% ethyl alcohol, and 210 parts of water was warmed until complete solution occurred. The mixture was then cooled which caused the separation of hexamethylene diammonium adipate (the salt) in the form of white crystals. The salt was separated from the solvent by filtration and recrystallized from a mixture of 1300 parts of 95% ethyl alcohol and 200 parts of water. The recrystallized salt amounted to 247 parts. It melted at 183–184° C. and had the composition required for hexamethylene diammonium adipate, $C_{12}H_{26}O_4N_2$.

Example II

The salt of decamethylenediamine and p-phenylene diacetic acid was made by adding a solution of 36 parts of the diamine in 160 parts of alcohol to a hot solution of 39 parts of the acid ($p—C_6H_4(CH_2COOH)_2$) in 480 parts of alcohol. This caused the salt to precipitate at once. It was recrystallized from a mixture of 280 parts of alcohol and 100 parts of water. It melted at 192–194° C.

Example III

A solution of 180 parts of decamethylenediamine in 250 parts of methanol was added to a filtered solution of 146 parts of adipic acid in 400 parts of methanol. The mixture was cooled and 300 parts of ether was slowly added with stirring. A fine white precipitate formed which was filtered off and washed twice with a 50% ether-methanol solution. The salt was dried under pressure. The yield was 305 parts or 95%.

While it is desirable to prepare the products of this invention by mixing the diamine and dicarboxylic acid in a mutual solvent, the salts may be prepared by other methods such as by admixing the reactants in the presence of a non-solvent, for instance benezene, or in the complete absence of other substances, as for example, by fusing the reactants together. The diamines are in general liquids or low-melting solids and react with the dibasic acids alone even though the latter may be only slightly soluble in the diamines. When this procedure is followed the use of agitation and moderately elevated temperatures, e. g., 100° C., is desirable.

It is within the scope of this invention to prepare mixed salts as well as mixtures of salts, by reacting one or more diamines with one or more dicarboxylic acids. In the preparation of these types of salts it is necessary that one of the diamines and one of the dibasic acids conform to the formula previously given, but it is not necessary that all of the diamine used be of formula $H_2NCH_2RCH_2NH_2$ or that all of the dibasic acid used be of formula $HOOCCH_2R'CH_2COOH$. As examples of other reactants which may be used in the preparation of the mixed salts might be mentioned ethylenediamine, p-phenylenediamine, beta-beta'diamino-diethyl ether, oxalic acid, malonic acid, fumaric acid, maleic acid, phthalic acid, diglycolic, salicylacetic acid, diphenylolpropane diacetic acid, and dithioglycolic acid. It is also within the scope of this invention to use small amounts of monoamines and monobasic acids in the preparation of the salts.

It will be seen from the foregoing description that I have, through the production of the diamine-dibasic acid salts described herein, provided a highly advantageous and convenient means for converting diamines and dibasic acids, in accordance with the principles set forth in the above mentioned application, into superpolyamides having a uniformity in their fiber-forming properties that is difficult to obtain otherwise. The salts of this invention can also be used as buffers and in some instances as insecticides.

As many apparently widely different embodiments of this invention may be made without departing from the spirit and scope thereof, it is to be understood that I do not limit myself specifically to the embodiments thereof except as defined in the appended claims.

I claim:

1. A salt derived from the reaction of a diamine of the formula $H_2NCH_2RCH_2NH_2$ and a dicarboxylic acid of the formula $$HOOCCH_2R'CH_2COOH,$$

in which R and R' are divalent hydrocarbon radicals free from olefinic and acetylenic unsaturation and in which R has a chain length of at least two carbon atoms.

2. The salt set forth in claim 1 in which R is $(CH_2)_x$ and R' is $(CH_2)_y$, $x$ and $y$ being integers, and $x$ being at least 2.

3. A salt of the formula $$NH_2CH_2RCH_2NH_2.HOOCCH_2RCH_2COOH$$

in which R and R' are divalent hydrocarbon radicals free from olefinic and acetylenic unsaturation and in which R has a chain length of at least two carbon atoms.

4. A salt which dissociates in water to give diammonium ions of formula

$$\overset{+}{N}H_3CH_2RCH_2\overset{+}{N}H_3$$

and dicarboxylic ions of formula

$$\overset{-}{O}OCCH_2RCH_2CO\overset{-}{O}$$

in which R and R' are divalent hydrocarbon radicals free from olefinic and acetylenic unsaturation and in which R has a chain length of at least two carbon atoms.

5. The salt set forth in claim 3 in which R is $(CH_2)_x$ and R' is $(CH_2)_y$, $x$ and $y$ being integers, and $x$ being at least 2.

6. The salt set forth in claim 4 in which R is $(CH_2)_x$ and R' is $(CH_2)_y$, $x$ and $y$ being integers, and $x$ being at least 2.

7. A composition of matter obtained by reacting under salt forming conditions at least two diamines of the formula $H_2NCH_2RCH_2NH_2$ with at least two dicarboxylic acids of the formula $HOOCCH_2R'CH_2COOH$, in which R and R' are divalent hydrocarbon radicals free from olefinic and acetylenic unsaturation and in which R has a chain length of at least two carbon atoms.

8. A mixture of at least two different diamine-dibasic acid salts, said salts being the reaction product of a diamine of the formula $$H_2NCH_2RCH_2NH_2$$

and a dicarboxylic acid of the formula $$HOOCCH_2R'CH_2COOH,$$

in which R and R' are divalent hydrocarbon radicals free from olefinic and acetylenic unsaturation and in which R has a chain length of at least two carbon atoms.

9. A process for making a diamine-dicarboxylic acid salt which comprises reacting below the decomposition temperature of the salt a diamine of the formula $H_2NCH_2RCH_2NH_2$ and a dicarboxylic acid of the formula $HOOCCH_2R'CH_2COOH$, in which R and R' are divalent hydrocarbon radicals free from olefinic and acetylenic unsaturation and in which R has a chain length of at least two carbon atoms.

10. The process set forth in claim 9 in which the reaction temperature is from 0° C. to 100° C.

11. The process set forth in claim 9 in which R is $(CH_2)_x$ and R' is $(CH_2)_y$, $x$ and $y$ being integers, and $x$ being at least 2.

12. A process for making a diamine-dicarboxylic acid salt which comprises reacting in the presence of an organic solvent below the decomposition temperature of the salt a diamine of the formula $H_2NCH_2RCH_2NH_2$ and a dicarboxylic acid of the formula $HOOCCH_2R'CH_2COOH$, in which R and R' are divalent hydrocarbon radicals free from olefinic and acetylenic unsaturation and in which R has a chain length of at least two carbon atoms.

13. The process set forth in claim 12 in which the reaction temperature is from 0° C. to 100° C.

14. A salt derived from the reaction of hexamethylene diamine and adipic acid.

15. A salt derived from the reaction of hexamethylene diamine and sebacic acid.

16. A salt derived from the reaction of decamethylene diamine and adipic acid.

17. The process set forth in claim 12 wherein the organic solvent is an alcohol.

18. The process set forth in claim 12 wherein the diamine is hexamethylene diamine, the dicarboxylic acid is adipic acid, and the organic solvent is methanol.

WALLACE HUME CAROTHERS.

Certificate of Correction

Patent No. 2,130,947.     September 20, 1938.

WALLACE HUME CAROTHERS

It is hereby certified that errors appear in the printed specification of the above numbered patent requiring correction as follows: Page 3, first column, line 65, Example III, for "benezene" read *benzene;* and second column, line 64, claim 4; for the formula "$\overline{OOCCH_2RCH_2COO}$" read $\overline{OOCCH_2R'CH_2COO}$; and that the said Letters Patent should be read with these corrections therein that the same may conform to the record of the case in the Patent Office.

Signed and sealed this 25th day of October, A. D. 1938.

[SEAL]     Henry Van Arsdale

*Acting Commissioner of Patents.*